United States Patent
Tahara et al.

(10) Patent No.: US 11,552,525 B2
(45) Date of Patent: Jan. 10, 2023

(54) ROTATING ELECTRICAL MACHINE INCLUDING A REFRIGERANT PASSAGE

(71) Applicant: Mitsubishi Electric Corporation, Tokyo (JP)

(72) Inventors: Jun Tahara, Tokyo (JP); Takashi Hashiba, Tokyo (JP); Satoshi Mitsunaga, Tokyo (JP); Hiroyuki Higashino, Tokyo (JP); Mitsunori Ishizaki, Tokyo (JP); Toshiaki Kashihara, Tokyo (JP); Tadashi Murakami, Tokyo (JP); Yoshinobu Utsumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 192 days.

(21) Appl. No.: 16/896,321

(22) Filed: Jun. 9, 2020

(65) Prior Publication Data
US 2021/0226506 A1    Jul. 22, 2021

(30) Foreign Application Priority Data
Jan. 20, 2020 (JP) .............................. JP2020-006507

(51) Int. Cl.
*H02K 5/20* (2006.01)
*H02K 5/22* (2006.01)
(Continued)

(52) U.S. Cl.
CPC .............. *H02K 5/225* (2013.01); *H02K 5/20* (2013.01); *H02K 11/33* (2016.01); *H02K 9/06* (2013.01); *H02K 11/02* (2013.01); *H02K 11/21* (2016.01)

(58) Field of Classification Search
CPC .......... H02K 5/20; H02K 5/203; H02K 5/207; H02K 5/225; H02K 9/02; H02K 9/04;
(Continued)

(56) References Cited

U.S. PATENT DOCUMENTS

2013/0301220 A1*  11/2013  Hotta ................. H05K 7/20927
                                                    361/699
2017/0264167 A1*   9/2017  Tahara ..................... H02K 9/00
2019/0288582 A1    9/2019  Tahara et al.

FOREIGN PATENT DOCUMENTS

DE    10 2011 087 602 A1    6/2013
EP         3 231 650 A1    10/2017
(Continued)

OTHER PUBLICATIONS

Japanese Office Action dated Jan. 6, 2021 in Patent Application No. 2020-006507.
(Continued)

*Primary Examiner* — Eric Johnson
(74) *Attorney, Agent, or Firm* — Sughrue Mion, PLLC; Richard C. Turner

(57) ABSTRACT

A rotating electrical machine such that a power supply unit can be efficiently cooled, with no increase in size in an axial direction of the rotating electrical machine, is provided. A rotating electrical machine main body and a power supply unit are integrally fixed, and a refrigerant passage is provided on the rotating electrical machine main body side of a metal frame configuring the power supply unit. The refrigerant passage and a control part that controls power supplied to the rotating electrical machine main body are disposed in the same plane in an axial direction of the rotating electrical machine main body, and the refrigerant passage is disposed farther to a radial direction outer side of the rotating electrical machine main body than the control part.

18 Claims, 3 Drawing Sheets

(51) Int. Cl.
*H02K 9/06* (2006.01)
*H02K 11/02* (2016.01)
*H02K 11/21* (2016.01)
*H02K 11/33* (2016.01)

(58) Field of Classification Search
CPC ............ H02K 9/06; H02K 9/19; H02K 9/193; H02K 11/02; H02K 11/21; H02K 11/30; H02K 11/33
See application file for complete search history.

(56) References Cited

FOREIGN PATENT DOCUMENTS

| | | | | | |
|---|---|---|---|---|---|
| JP | 2017085692 | A | * | 5/2017 | |
| JP | 2017-192285 | A | | 10/2017 | |
| JP | 2017192285 | A | * | 10/2017 | |
| JP | 2018143021 | A | * | 9/2018 | |
| JP | 2019-161923 | A | | 9/2019 | |
| WO | WO-2019012994 | A1 | * | 1/2019 | ............. H02K 11/33 |

OTHER PUBLICATIONS

French Search Report dated Sep. 16, 2021 with Written Opinion of the Patentability of the Invention in Application No. 2008602.

* cited by examiner

ROTATING ELECTRICAL MACHINE INCLUDING A REFRIGERANT PASSAGE

BACKGROUND OF THE INVENTION

Field of the Invention

The present application relates to a rotating electrical machine.

Description of the Related Art

A rotating electrical machine wherein a power supply unit including a power circuit unit and a rotating electrical machine main body are integrated and mounted in a vehicle such as an automobile is already known, as disclosed in, for example, Patent Literature 1. When the rotating electrical machine operates as a motor that drives an internal combustion engine, the power supply unit including the power circuit unit converts direct current power from a direct current power source such as a battery mounted in the vehicle into alternating current power, and supplies the alternating current power to the rotating electrical machine main body. Also, when the rotating electrical machine operates as a generator by being driven by the internal combustion engine, the power supply unit converts alternating current power generated by the rotating electrical machine main body into direct current power, and supplies the direct current power to the direct current power source. As is commonly known, the power circuit unit is configured of a multiple of semiconductor switching elements.

An electronic part such as a semiconductor switching element configuring the power circuit unit generates heat due to operating owing to a current flowing, because of which the electronic part needs to be cooled. When heat generation density increases due to an increase in output or a reduction in size of the power supply unit, and a temperature rise cannot be restricted by air cooling, a medium with high heat transmission is used.

Patent Literature 1: DE 10 2011 087 602

When a heat generating part is disposed over the whole of the power circuit unit, a refrigerant needs to be disposed over the whole of the power circuit unit. When a refrigerant is disposed between the power circuit unit and the rotating electrical machine main body, as in Patent Literature 1, a problem occurs in that the power supply unit increases in size in an axial direction of the rotating electrical machine, and interferes with other apparatus in a periphery.

SUMMARY OF THE INVENTION

The present application discloses technology for resolving the aforementioned kind of problem, and has an object of providing a rotating electrical machine such that a power supply unit can be efficiently cooled with no increase in size in the axial direction of the rotating electrical machine.

A rotating electrical machine disclosed in the present application is a rotating electrical machine including a rotating electrical machine main body and a power supply unit, wherein the rotating electrical machine main body and the power supply unit are integrally fixed by being disposed in parallel in an axial direction of the rotating electrical machine main body. The rotating electrical machine main body includes a stator fixed to a housing, a rotor fixed to a rotor shaft supported so as to rotate freely by the housing, and a cooling fan that rotates together with the rotor, causes a cooling air to be suctioned into an interior of the housing from an intake port provided in the housing and opening in the axial direction, and causes the cooling air to be discharged to an exterior of the housing from an exhaust port provided in the housing. The power supply unit includes a power circuit unit including a power semiconductor module that controls power supplied to the rotating electrical machine main body and a control part that controls power supplied to the rotating electrical machine main body, a control substrate including a control circuit unit that controls the power circuit unit, and a metal frame on which the power circuit unit and the control substrate are mounted, and in which a refrigerant passage along which a refrigerant is caused to flow is provided. The refrigerant passage is provided on the rotating electrical machine main body side of the metal frame, and is disposed in the same axial direction plane as the control part.

According to the rotating electrical machine disclosed in the present application, a rotating electrical machine such that a power supply unit can be efficiently cooled, with no increase in size in an axial direction, can be provided.

The foregoing and other objects, features, aspects, and advantages of the present application will become more apparent from the following detailed description of the present application when taken in conjunction with the accompanying drawings.

DETAILED DESCRIPTION OF THE PREFERRED EMBODIMENTS

Figure 1:
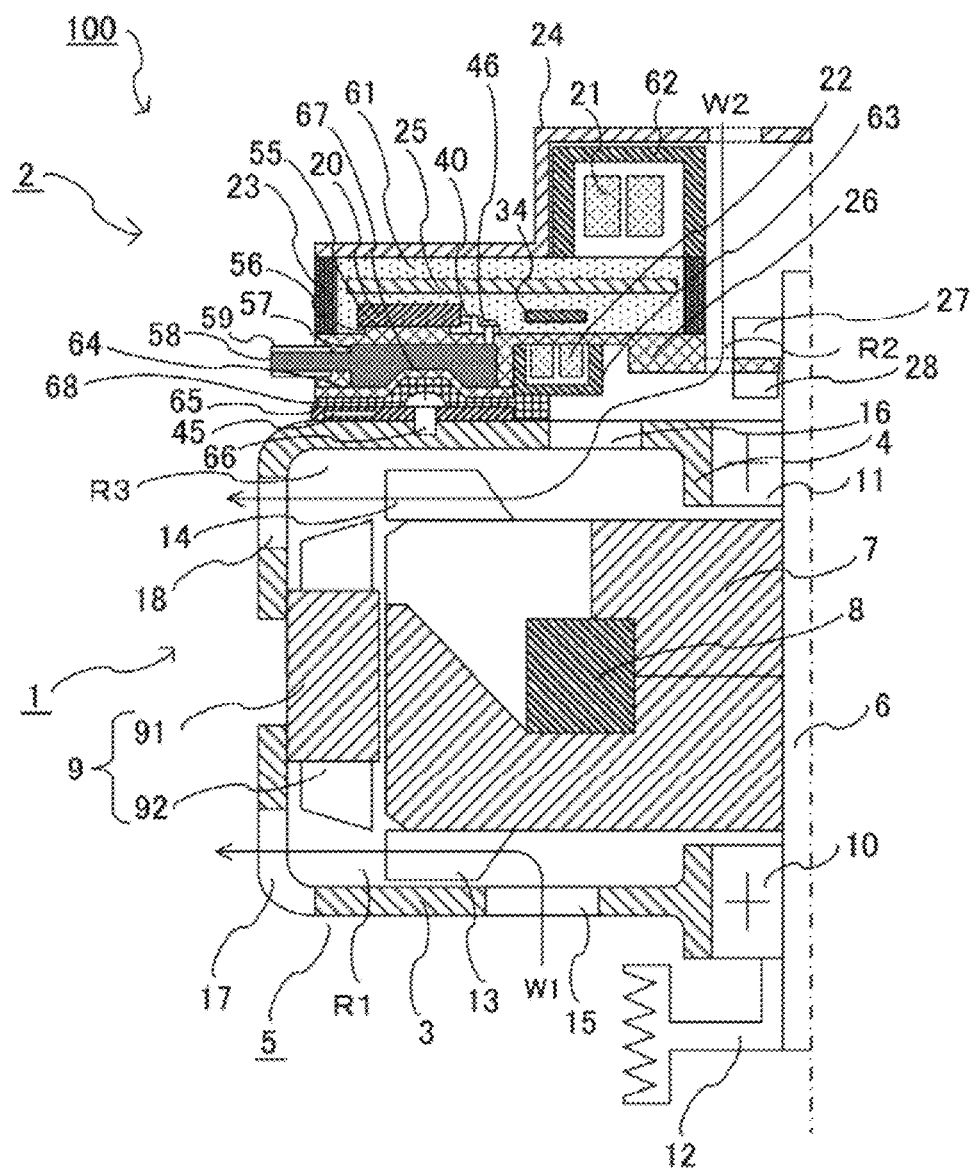
FIG. 1 is a main portion sectional view showing a rotating electrical machine according to a first embodiment.

Hereafter, using the drawings, an embodiment of a rotating electrical machine according to the present application will be described. Identical reference signs are allotted to identical or corresponding portions in the drawings.

First Embodiment

Figure 2:
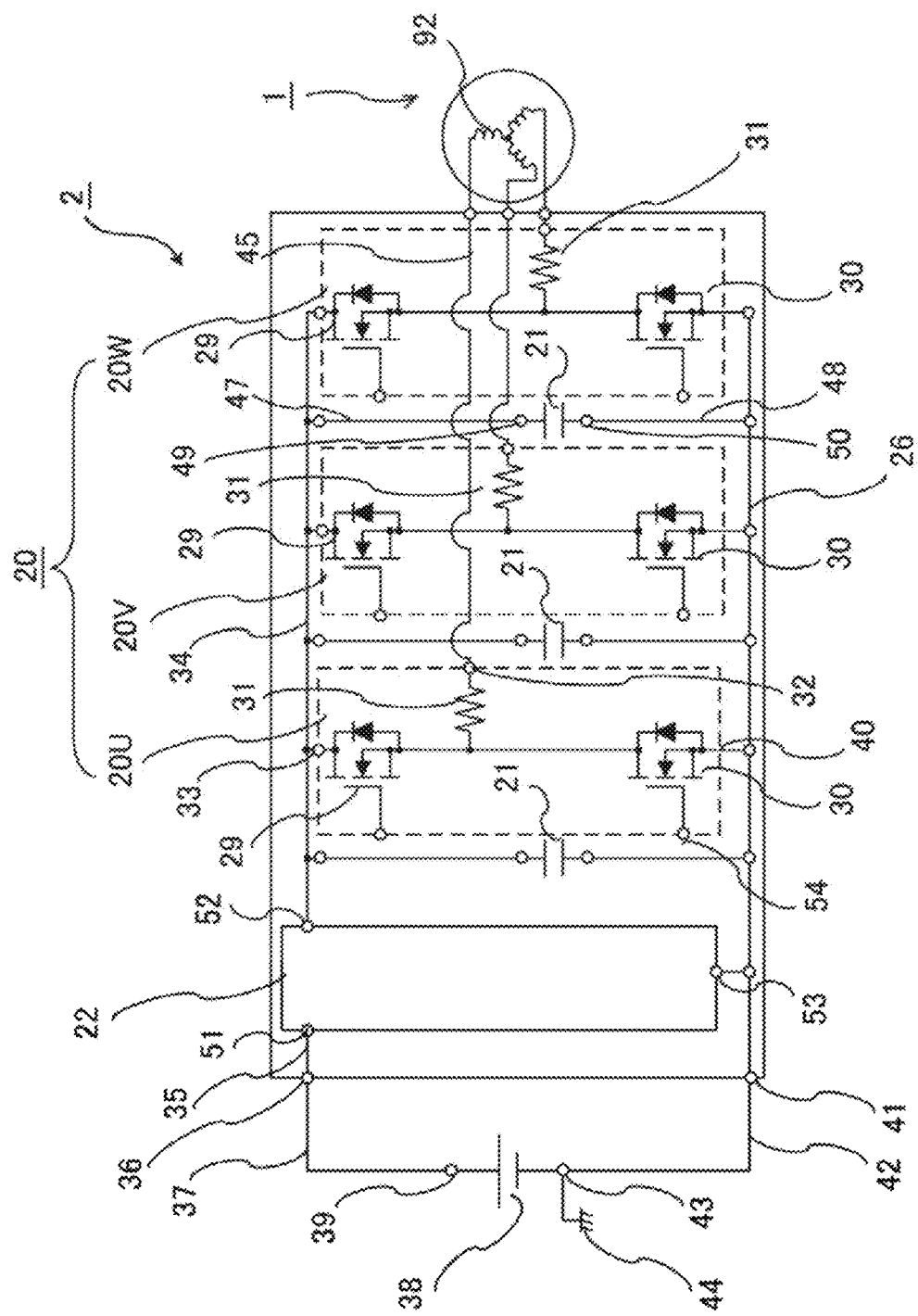
FIG. 2 is a circuit diagram of the rotating electrical machine according to the first embodiment.
Figure 3:
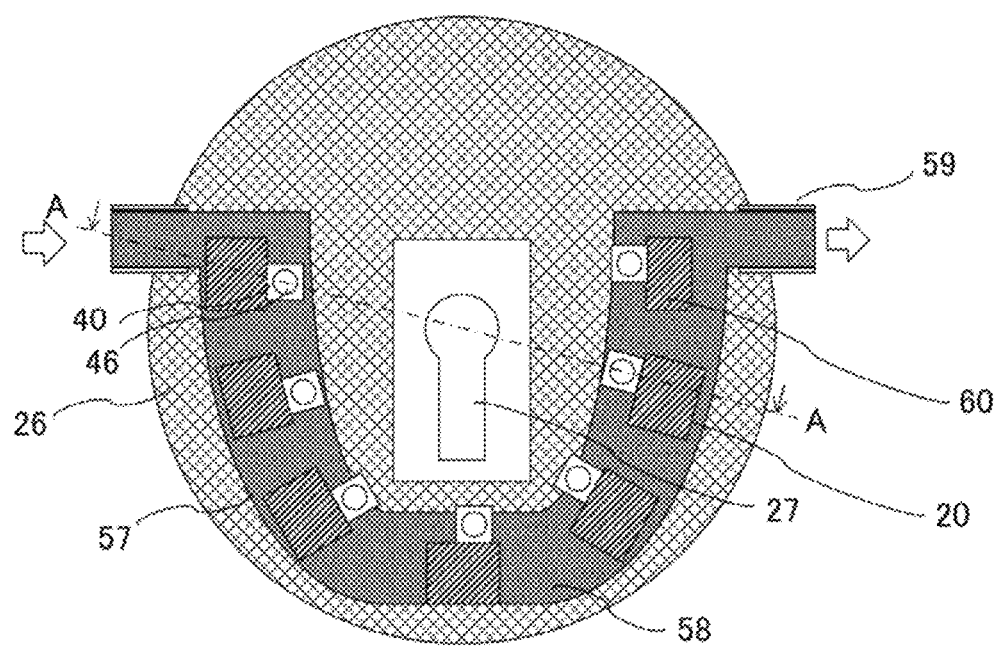
FIG. 3 is a drawing illustrating a power supply unit of the rotating electrical machine according to the first embodiment.
Figure 4:
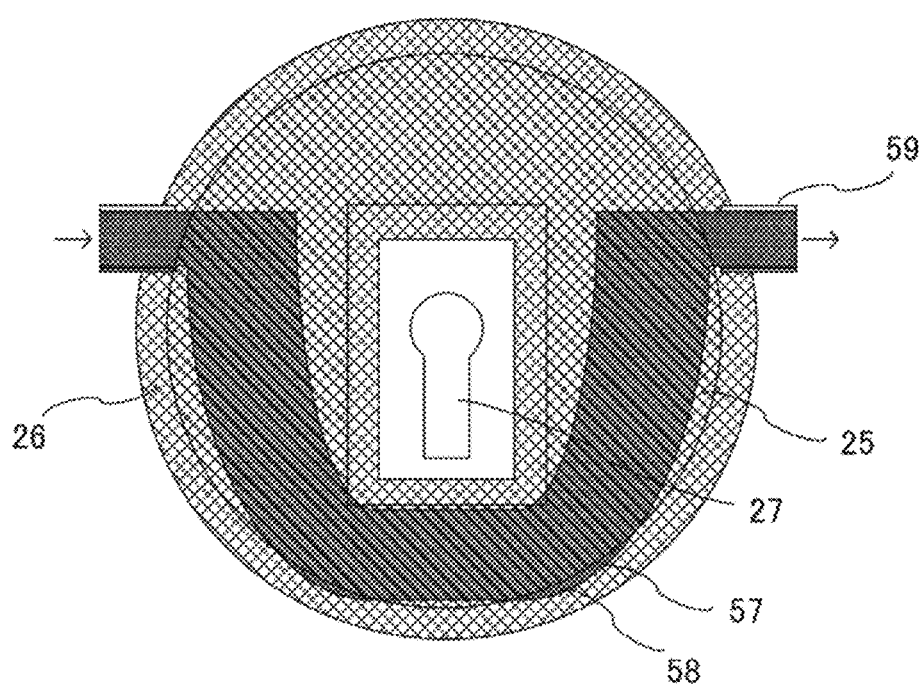
FIG. 4 is a drawing illustrating the power supply unit of the rotating electrical machine according to the first embodiment.

FIG. 1 is a main portion sectional view showing a rotating electrical machine according to a first embodiment, and shows a cross-section of a main portion seen in a direction of arrows of an A-A line of FIG. 3. FIG. 2 is a circuit diagram configured mainly of a power supply unit of the rotating electrical machine according to the first embodiment, and FIGS. 3 and 4 are drawings illustrating the power supply unit of the rotating electrical machine according to the first embodiment. In the following description, a reference simply to an axial direction means an axial direction of the rotating electrical machine or of a rotating electrical machine main body, and a reference to a radial direction means a radial direction of the rotating electrical machine or of the rotating electrical machine main body.

In FIGS. 1 to 4, a rotating electrical machine 100 includes a rotating electrical machine main body 1 and a power supply unit 2, integrated with the rotating electrical machine main body 1 by being disposed in parallel with the rotating electrical machine main body 1 in an axial direction thereof, that supplies power to the rotating electrical machine main body 1. The rotating electrical machine main body 1 operates as a motor that drives an internal combustion engine (not shown), or can operate as a generator that generates heat by being driven by the internal combustion engine. The rotating electrical machine 100 according to the first embodiment is configured as a rotating electrical machine for starting an internal combustion engine.

The rotating electrical machine main body 1 includes a front bracket 3 as a load side bracket and a rear bracket 4 as a non-load side bracket, each formed in a bowl form using a metal material such as iron, a housing 5 formed of the front bracket 3 and the rear bracket 4, a rotor 7 fixed to a rotor shaft 6, a field winding 8 provided in the rotor 7, and a stator 9. The stator 9 includes a stator core 91, and a stator winding 92 mounted on the stator core 91.

The rotor shaft 6 is supported so as to be able to rotate by the housing 5 using a front side bearing 10 provided on the front bracket 3 and a rear side bearing 11 provided on the rear bracket 4. The rotor 7 is fixed to the rotor shaft 6, and disposed so as to be able to rotate in an interior of the housing 5. The stator core 91 is clamped from either axial direction side by one axial direction end portion of the front bracket 3 and one axial direction end portion of the rear bracket 4, thereby being fixed to the housing 5. An inner peripheral face of the stator 9 opposes an outer peripheral face of the rotor 7 across a predetermined air gap in a radial direction of the rotating electrical machine main body 1.

A pulley 12 is mounted on a front side end portion of the rotor shaft 6 protruding on a non-rotating electrical machine main body 1 side from the front bracket 3. The rotating electrical machine main body 1 is coupled to a crankshaft (not shown) of the internal combustion engine via the pulley 12 and a belt (not shown) wound around the pulley 12.

A first cooling fan 13 fixed to a front side end face of the rotor 7 and a second cooling fan 14 fixed to a rear side end face of the rotor 7 rotate together with the rotor 7. A first intake port 15 that suctions cooling air into an interior of the rotating electrical machine main body 1 is provided in an axial direction end portion of the front bracket 3, and a second intake port 16 that suctions cooling air into the interior of the rotating electrical machine main body 1 is provided in an axial direction end portion of the rear bracket 4. A multiple of the first intake port 15 and the second intake port 16 are provided in a periphery of the rotor shaft 6. A first exhaust port 17 that discharges cooling air from the interior of the rotating electrical machine main body 1 to an exterior is provided in an outer peripheral face portion of the front bracket 3, and a second exhaust port 18 that discharges cooling air from the interior of the rotating electrical machine main body 1 to the exterior is provided in an outer peripheral face portion of the rear bracket 4.

A first ventilation passage R1 that connects the first intake port 15 and the first exhaust port 17 is formed between an axial direction inner end face of the front bracket 3 and a load side axial direction end face of the rotor 7. The first cooling fan 13 is disposed in the first ventilation passage R1. A second ventilation passage R2 is formed between an inner peripheral portion of the power supply unit 2, to be described hereafter, and an outer peripheral face of the rotor shaft 6, and connects the exterior of the rotating electrical machine 100 and the second intake port 16 of the rear bracket 4. A third ventilation passage R3 that connects the second intake port 16 and the second exhaust port 18 is formed between an axial direction inner end face of the rear bracket 4 and a non-load side axial direction end face of the rotor 7. The second cooling fan 14 is disposed in an interior of the third ventilation passage R3.

A first cooling air W1 is suctioned into the first intake port 15 from the exterior of the front bracket 3 by centrifugal force caused by rotation of the first cooling fan 13, and discharged from the first ventilation passage R1 to the exterior of the rotating electrical machine main body 1 via the first exhaust port 17. A second cooling air W2 is suctioned into the second ventilation passage R2 from the exterior of the power supply unit 2 by centrifugal force caused by rotation of the second cooling fan 14, reaches the third ventilation passage R3 via the second intake port 16 of the rear bracket 4, and is discharged to the exterior of the rotating electrical machine main body 1 via the second exhaust port 18.

The power supply unit 2 is configured of a power semiconductor module 20 including an upper arm power semiconductor switching element, a lower arm power semiconductor switching element, and a shunt resistor, to be described hereafter, a smoothing capacitor 21 that smooths a current flowing through the stator winding 92 (refer to FIG. 2), an input filter 22 that includes a capacitor, a coil, or the like, and restricts noise, a case 23 made of a resin, a cover 24 made of a resin, a control substrate 25, a metal frame 26, a brush 27 that supplies power to the rotor 7, a rotation sensor 28 that detects a rotation of the rotating electrical machine 100, and the like. The power semiconductor module 20, the smoothing capacitor 21, and the input filter 22 configure a power circuit unit. The metal frame 26 functions as a heatsink, and is formed in a circular form as seen in the axial direction of the rotating electrical machine main body 1, as shown in FIGS. 3 and 4. Herein, each of the smoothing capacitor 21, the input filter 22, the brush 27, and the rotation sensor 28 configures a control part, and controls power supplied to the rotating electrical machine main body 1 in the same way as the power semiconductor module 20. The input filter 22 may be unnecessary when noise restriction is unneeded.

The power semiconductor module 20 is such that one thereof is configured as one phase, and when the rotating electrical machine main body 1 is a three-phase rotating electrical machine, three power semiconductor modules 20 are provided, and are connected in parallel. That is, as the rotating electrical machine main body 1 is configured as a three-phase rotating electrical machine main body in the first embodiment, the power semiconductor module 20 is configured of a U-phase power semiconductor module 20U, a V-phase power semiconductor module 20V, and a W-phase power semiconductor module 20W, as shown in FIG. 2.

Each of the U-phase power semiconductor module 20U, the V-phase power semiconductor module 20V, and the W-phase power semiconductor module 20W is configured of a serially-connected body of an upper arm power semiconductor switching element 29 and a lower arm power semiconductor switching element 30, and of a shunt resistor 31 to be described hereafter. The U-phase power semiconductor module 20U, the V-phase power semiconductor module 20V, and the W-phase power semiconductor module 20W configure a three-phase bridge circuit.

Each of the upper arm power semiconductor switching element 29 and the lower arm power semiconductor switching element 30 is configured of a parallel-connected body of, for example, a field effect transistor (FET) and a diode.

The shunt resistor 31, which forms a current sensor, is connected between a series connection portion of the upper arm power semiconductor switching element 29 and the lower arm power semiconductor switching element 30 in each of the U-phase power semiconductor module 20U, the V-phase power semiconductor module 20V, and the W-phase power semiconductor module 20W and an alternating current terminal 32 in each of the U-phase power semiconductor module 20U, the V-phase power semiconductor module 20V, and the W-phase power semiconductor module 20W. In FIG. 2, in order to avoid complicating the drawing, the alternating current terminal reference sign 32 is allotted to only the alternating current terminal of the U-phase power semiconductor module 20U.

A positive electrode side terminal 33 of each of the U-phase power semiconductor module 20U, the V-phase power semiconductor module 20V, and the W-phase power semiconductor module 20W is connected via a first positive electrode side conductor 34 of the power supply unit 2, the input filter 22, a second positive electrode side conductor 35 of the power supply unit 2, a positive electrode side terminal 36 of the power supply unit 2, and a positive electrode side cable 37, to a positive electrode side terminal 39 of a battery 38 that acts as a direct current power source mounted in a vehicle. In FIG. 2, in order to avoid complicating the drawing, the positive electrode side terminal reference sign 33 is allotted to only the positive electrode side terminal of the U-phase power semiconductor module 20U.

A negative electrode side terminal 40 of each of the U-phase power semiconductor module 20U, the V-phase power semiconductor module 20V, and the W-phase power semiconductor module 20W is connected via the metal frame 26, the input filter 22, a negative electrode side terminal 41 of the power supply unit 2, and a negative electrode side cable 42, to a negative electrode side terminal 43 of the battery 38, which acts as a direct current power source mounted in the vehicle. The negative electrode side terminal 43 of the battery 38 is connected to a vehicle body 44, which is at the ground potential of the vehicle. In FIG. 2, in order to avoid complicating the drawing, the negative electrode side terminal reference sign 40 is allotted to only the negative electrode side terminal of the U-phase power semiconductor module 20U.

The alternating current terminal 32 in each of the U-phase power semiconductor module 20U, the V-phase power semiconductor module 20V, and the W-phase power semiconductor module 20W is connected via a bus bar 45 to a winding terminal of a respective phase of the stator winding 92 of the rotating electrical machine main body 1. In FIG. 2, in order to avoid complicating the drawing, the bus bar reference sign 45 is allotted to only the bus bar connecting the alternating current terminal 32 of the U-phase power semiconductor module 20U and the stator winding 92.

The positive electrode side terminal 33 of each of the U-phase power semiconductor module 20U, the V-phase power semiconductor module 20V, and the W-phase power semiconductor module 20W is connected to the first positive electrode side conductor 34 of the power supply unit 2. The negative electrode side terminal 40 of each of the U-phase power semiconductor module 20U, the V-phase power semiconductor module 20V, and the W-phase power semiconductor module 20W is connected to the metal frame 26 by a first screw 46.

Furthermore, each of the U-phase power semiconductor module 20U, the V-phase power semiconductor module 20V, and the W-phase power semiconductor module 20W is connected in parallel to the smoothing capacitor 21 via connecting conductors 47 and 48. In FIG. 2, in order to avoid complicating the drawing, the connecting conductor reference signs 47 and 48 are allotted to only the connecting conductors connected to the smoothing capacitor 21 connected in parallel to the W-phase power semiconductor module 20W.

A positive electrode side terminal 49 of each smoothing capacitor 21 is connected via the connecting conductor 47 to the first positive electrode side conductor 34 of the power supply unit 2, and a negative electrode side terminal 50 of each smoothing capacitor 21 is connected via the connecting conductor 48 to the metal frame 26. In FIG. 2, in order to avoid complicating the drawing, the positive electrode side terminal reference sign 49 and the negative electrode side terminal reference sign 50 are allotted to only the positive electrode side terminal and the negative electrode side terminal of the smoothing capacitor 21 connected in parallel to the W-phase power semiconductor module 20W.

A first positive electrode terminal 51 of the input filter 22 is connected to the second positive electrode side conductor 35 of the power supply unit 2, and a second positive electrode terminal 52 of the input filter 22 is connected to the first positive electrode side conductor 34 of the power supply unit 2. Further, a negative electrode terminal 53 of the input filter 22 is connected to the metal frame 26. Herein, the first positive electrode side conductor 34 is disposed parallel to the metal frame 26. Because of this, a planar portion of the first positive electrode side conductor 34 is disposed opposing the metal frame 26, and a positive electrode and a negative electrode are parallel to each other, whereby inductance is reduced, and noise and switching loss can be restricted.

Also, a signal terminal 54 of each of the upper arm power semiconductor switching element 29 and the lower arm power semiconductor switching element 30 in the U-phase power semiconductor module 20U, the V-phase power semiconductor module 20V, and the W-phase power semiconductor module 20W is connected to the control substrate 25 shown in FIG. 1, and is configured so as to receive a control signal from a control circuit unit provided on the control substrate 25. In FIG. 2, in order to avoid complicating the drawing, the signal terminal reference sign 54 is allotted to only the signal terminal of the lower arm power semiconductor switching element 30 in the U-phase power semiconductor module 20U.

The power semiconductor module 20 is configured by the upper arm power semiconductor switching element 29, the lower arm power semiconductor switching element 30, and the shunt resistor 31 being joined by soldering to a copper frame, and frames being connected using a copper plate and an aluminum wire, and sealed with a resin. Alternatively, the power semiconductor module 20 is configured by the upper arm power semiconductor switching element 29, the lower arm power semiconductor switching element 30, and the shunt resistor being joined by soldering to a metal substrate of insulator-coated aluminum, copper, or the like, or to a ceramic substrate.

The power semiconductor module 20 has a heat dissipating face 55 that dissipates heat generated by the upper arm power semiconductor switching element 29, the lower arm power semiconductor switching element 30, and the shunt resistor 31. The power semiconductor module 20 is such that the heat dissipating face 55 opposes a surface of a protruding portion 56 formed protruding on a mounting face that is a non-rotating electrical machine main body 1 side surface of the metal frame 26, and is mounted on the protruding portion 56 of the metal frame 26.

Herein, when a conductive member in at least one portion of the upper arm power semiconductor switching element 29, the lower arm power semiconductor switching element 30, and the shunt resistor 31 is exposed in the heat dissipating face 55 of the power semiconductor module 20, a predetermined distance is secured between the heat dissipating face 55 and the mounting face of the metal frame 26, a heat transmitting member having insulating properties is interposed between the heat dissipating face 55 and the mounting face of the metal frame 26, and the power semiconductor module 20 is mounted on the protruding portion 56 of the metal frame 26. A grease, a gel, or an adhesive having viscosity and fluidity, or a sheet, a tape, or the like that does not have fluidity, can be used as the heat transmitting member.

When the heat dissipating face 55 of the power semiconductor module 20 is isolated from the upper arm power semiconductor switching element 29, the lower arm power semiconductor switching element 30, and the shunt resistor 31, a conductive heat transmitting member can be used instead of the aforementioned heat transmitting member, and there is no need to secure a distance between the heat dissipating face 55 and the mounting face of the metal frame 26.

A refrigerant passage 57 is formed as a cooling mechanism in the metal frame 26 in a circumferential direction of the metal frame 26, in a position in an interior of the metal frame 26 corresponding to the protruding portion 56 on which the power semiconductor module 20 is mounted. The metal frame 26 includes an inlet/outlet portion 59 that forms an inlet and an outlet of a refrigerant 58, and the refrigerant 58 is caused to flow through an interior of the refrigerant passage 57. Because of this, heat generated by the upper arm power semiconductor switching element 29, the lower arm power semiconductor switching element 30, and the shunt resistor 31 of the power semiconductor module 20 is effectively transmitted over a wide range of the metal frame 26, whereby a temperature rise can be restricted. By the inlet/outlet portion 59 of the refrigerant 58 being disposed in a radial direction of the metal frame 26, the metal frame 26 no longer needs to be increased in size in the radial direction, and can be reduced in size in the radial direction. Herein, by a porous metal being used for the metal frame 26, a surface area can be increased even with the same size, because of which a cooling performance can be improved. An inlet side and an outlet side of the inlet/outlet portion 59 are disposed in radially opposite directions.

FIG. 3 is an illustration of the power supply unit wherein the rotating electrical machine 100 is seen from the non-load side. FIG. 1 is a sectional view wherein a cross-section along the A-A line of FIG. 3 is seen in the direction of the arrows.

The refrigerant passage 57 and the brush 27 are disposed in the same axial direction plane on an outer side of an axial direction end face of the rear bracket 4. Because of this, a configuration is such that there is no redundancy in the radial direction of the metal frame 26, and the radial direction of the rotating electrical machine 100 can be reduced in size. Also, the negative electrode side terminal 40 of the power semiconductor module 20 is fastened above the refrigerant 58 of the metal frame 26 by the first screw 46, because of which a cooling performance of the negative electrode side terminal 40 of the power semiconductor module 20 can be improved. Because of this, a temperature rise of the power semiconductor switching elements and the shunt resistor in the interior can be restricted. Furthermore, the refrigerant passage 57 is configured in a U-shape, whereby pressure loss can be reduced.

Also, the signal terminal 54 of the power semiconductor module 20 is disposed on one side of the power semiconductor module 20, and disposed so as to face an outer peripheral side when mounted on the metal frame 26, whereby a signal terminal hole of the control substrate 25 is disposed so as to follow the outer periphery. Because of this, wiring pattern layout characteristics can be improved. Furthermore, by the refrigerant passage 57 being configured in a U-shape, the inlet portion and the outlet portion of the refrigerant 58 can be disposed on opposite sides in the radial direction of the metal frame 26, and there is no need to cause the refrigerant passage 57 to complete a full circle, because of which pressure loss can be reduced.

Furthermore, by the refrigerant passage 57 being disposed in an outer peripheral portion of the same plane in the axial direction of the brush 27, the axial direction can be reduced in size. By a multiple of control parts such as the smoothing capacitor 21, the rotation sensor 28, and the input filter 22 being disposed in the same plane in the axial direction as the refrigerant passage 57, in the same way as the brush 27, the axial direction can be further reduced in size. Also, by control parts such as the brush 27, the smoothing capacitor 21, the rotation sensor 28, and the input filter 22 being mounted directly on the metal frame 26, an increase in size of the axial direction can be restricted.

Herein, by the smoothing capacitor 21 and the input filter 22, a rise in temperature of which needs to be restricted, being disposed so as to sandwich the metal frame 26, interference of heat generated by each of the smoothing capacitor 21 and the input filter 22 can be restricted, and a rise in temperature of each can be restricted.

A field circuit module 60 (refer to FIG. 3) configured as a bridge circuit using a semiconductor switching element and a diode, and configuring a field circuit unit, is mounted on the protruding portion 56 of the metal frame 26, or on a mounting face other than the protruding portion 56. Further, although not shown, an upper arm side of the bridge circuit configuring the field circuit module 60 is connected to the positive electrode side terminal 39 of the battery 38, and a lower arm side is connected to the negative electrode side terminal 43 of the battery 38. Further, the field winding 8 is connected parallel to the diode configuring the field circuit module 60. As a current of the field circuit is smaller than a current of the stator winding 92, heat generated by the field circuit module 60 is less than that generated by the power semiconductor module 20.

Consequently, by the field circuit module 60, which generates a small amount of heat, being disposed on a downstream side of the power semiconductor module 20, which generates a large amount of heat, in the refrigerant passage 57, the power semiconductor module 20 is cooled by the low temperature refrigerant 58, because of which the cooling performance can be improved.

Although not shown, one or a multiple of heat dissipating fins, formed protruding perpendicularly to the axial direction of the rotating electrical machine main body 1 so as to extend in the radial direction of the rotating electrical machine main body 1, are provided in a region corresponding to a mounting region of the power semiconductor module 20 on a face of the metal frame 26 on a side opposite to the face on which the protruding portion 56 is formed.

An unshown electronic part such as a central processing unit (CPU) is mounted on the control substrate 25, and includes a control circuit unit that controls the semiconductor switching elements of the power circuit unit and the field circuit unit in the power supply unit 2 so as to be turned on and off. The control circuit unit provided on the control substrate 25 controls the switching elements of the power circuit unit and the field circuit unit so as to be turned on and off, causing the power circuit unit to carry out a power conversion between direct current power of the battery 38 and alternating current power of the stator winding 92, and causing the field circuit unit to carry out a control of field current supplied to the field winding 8.

As shown in FIG. 4, the control substrate 25 is configured in a circular form having a space in an interior thereof. Unshown heat generating parts are mounted on the control substrate 25 too, and are cooled by the refrigerant 58. Herein, the cooling performance can be improved by the heat generating parts being mounted in a U-shape so as to follow the refrigerant passage 57. The control substrate 25 may also be of a U-shape so as to follow the refrigerant passage 57.

The power semiconductor module 20, the control substrate 25, and the like, are mounted on a mounting face that is a face on the non-rotating electrical machine main body 1 side of the metal frame 26. The control substrate 25 is disposed parallel to the power semiconductor module 20 in the axial direction, across an interval in the axial direction of the rotating electrical machine main body 1 with respect to a surface on the non-metal frame 26 side of the power semiconductor module 20, and is mounted on the metal frame 26. Also, the resin case 23 is mounted on the mounting face of the metal frame 26 so as to envelop the power semiconductor module 20 and the control substrate 25 mounted on the mounting face of the metal frame 26. An aperture portion of the resin case 23 on a side opposite to that of the metal frame 26 is closed off by the resin cover 24, which protects the power semiconductor module 20 and the control substrate 25 mounted on the mounting face of the metal frame 26 from water, dust, and the like. By the power semiconductor module 20 being disposed on a face of the refrigerant passage 57 on the non-rotating electrical machine main body 1 side of the metal frame 26, and the control substrate 25 being disposed on a face of the power semiconductor module 20 on the non-rotating electrical machine main body 1 side of the metal frame 26, spreading in the radial direction of the power supply unit 2 is restricted, and the power supply unit 2 can be reduced in size in the radial direction.

Herein, an interior of the resin case 23 is filled with a potting member 61 (refer to FIG. 1) until the control substrate 25 is buried, because of which waterproofing and dustproofing can be improved, in addition to which vibration resistance and heat transmitting properties can be improved. Furthermore, by the cover 24 being made of a metal such as aluminum, heat transmitting properties and heat dissipating properties are improved, and noise propagation can be restricted. In certain cases, the interior of the resin case 23 need not be filled with the potting member 61.

By controlling the upper arm power semiconductor switching element 29 and the lower arm power semiconductor switching element 30 in the power semiconductor module 20 so as to be turned on and off, current flowing to the power supply unit 2 is controlled with high accuracy, whereby output accuracy is improved and efficiency can be improved, but output voltage of the power supply unit 2 fluctuates, and furthermore, current ripple occurs in an output current.

The smoothing capacitor 21 is for absorbing voltage fluctuation and current ripple, but due to current ripple being applied to the smoothing capacitor 21, the smoothing capacitor 21 generates heat, and the temperature rises. A rise in temperature of the smoothing capacitor 21 results in the smoothing capacitor 21 deteriorating, shortening a lifespan thereof. Therefore, in order to restrict deterioration of the smoothing capacitor 21, a capacitor case 62 in which the smoothing capacitor 21 is housed is disposed so as to be in contact with a second cooling air W2. Taking an amount of current ripple, a temperature rise, and the like into consideration, there may be a multiple of smoothing capacitors 21 in each phase.

The input filter 22 restricts noise, and is configured of a coil or a capacitor, but the coil or the capacitor generates heat due to energization by a current, and the temperature rises. A lifetime of a capacitor is shortened by a temperature rise, and a coil is such that a core used is demagnetized due to a temperature rise, and inductance decreases. Therefore, an input filter case 63 (refer to FIG. 1) in which the input filter 22 is housed is mounted on the refrigerant passage 57 or on the metal frame 26, and disposed so as to be in contact with the second cooling air W2. Taking current, voltage, an extent of noise restriction, and the like into account, there may be a multiple of the coils or the capacitors used in the input filter 22.

The brush 27 is mounted on the metal frame 26 in a peripheral edge portion of the rotor shaft 6, in an outer face portion on the non-rotor 7 side, that is, the side on which the power supply unit 2 is mounted, of the rear bracket 4. Although not shown, an energization unit electrically connected to the field winding 8 is attached to the rotor shaft 6, and a sliding portion of the brush 27 is configured so as to input an output of the field circuit unit into the field winding 8 by coming into contact with the energization unit.

The rotating electrical machine 100 is such that mounting portions (not shown) provided on the front bracket 3 and the rear bracket 4 are securely fixed by bolts to the vehicle body 44 of the vehicle, or to the internal combustion engine. The rear bracket 4 and the vehicle body 44 are electrically connected to the stator core 91 via the front bracket 3. When the metal frame 26 and the negative electrode side terminal 43 of the battery 38 can be electrically connected via the vehicle body 44, the negative electrode side cable 42 can be omitted.

Next, centering on FIG. 2, a flow of current in the rotating electrical machine 100 will be described. The flow of current differs between a case in which the rotating electrical machine 100 is caused to operate as a motor and a case in which the rotating electrical machine 100 is caused to operate as a generator, but herein, a case in which the rotating electrical machine 100 is caused to operate as a motor will be described.

Current flowing into the stator winding 92 of the rotating electrical machine main body 1 flows from the positive electrode side terminal 39 of the battery 38 into the power supply unit 2 via the positive electrode side cable 37 and the positive electrode side terminal 36 of the power supply unit 2, and flows into the stator winding 92 via the input filter 22 and the upper arm power semiconductor switching element 29 and shunt resistor 31 in a predetermined phase of the power semiconductor module 20. Subsequently, the current flows into the metal frame 26 via the shunt resistor 31 and the lower arm power semiconductor switching element 30 of the power semiconductor module 20 in another phase, and flows into the negative electrode side terminal 43 of the battery 38 via the negative electrode side terminal 41 and the negative electrode side cable 42 of the power supply unit 2.

A control pattern for controlling the upper arm power semiconductor switching element 29 and the lower arm power semiconductor switching element 30 so as to be turned on and off is computed in the CPU mounted on the control substrate 25 based on a value of current detected by the shunt resistor 31, information on a rotational speed of the rotating electrical machine 100 and/or a rotational position of the rotor 7 received from the rotation sensor 28, and information on temperatures of the upper arm power semiconductor switching element 29 and the lower arm power semiconductor switching element 30, and the like. The control circuit unit provided on the control substrate 25 generates a control signal based on a result of the computation by the CPU, and sends the control signal to the signal terminals of the upper arm power semiconductor switching element 29 and the lower arm power semiconductor switching element 30.

In the rotating electrical machine 100 according to the first embodiment configured as heretofore described, direct current power of the battery 38 is converted into alternating current power in the power supply unit 2, and supplied to the stator winding 92. Because of this, a rotating magnetic field is generated in the stator core 91, and the rotor 7 rotates. Further, the first cooling fan 13 and the second cooling fan 14 rotate in conjunction with the rotation of the rotor 7. Because of this, the first cooling air W1 supplied from the first intake port 15 flows along the first ventilation passage R1 on a front side of the rotating electrical machine 100, and is discharged to the exterior of the rotating electrical machine 100 from the first exhaust port 17. Further, a coil end of the stator winding 92 is cooled by the first cooling air W1 flowing along the first ventilation passage R1.

Meanwhile, on a rear side of the rotating electrical machine 100, the second cooling air W2 flows along the second ventilation passage R2 formed between an inner peripheral portion of the power supply unit 2 and an outer peripheral portion of the brush 27 to the load side in the axial direction of the rotating electrical machine 100, flows into the interior of the rotating electrical machine main body 1 from the second intake port 16, flows along the third ventilation passage R3, and is discharged to the exterior of the rotating electrical machine main body 1 from the second exhaust port 18.

The capacitor case 62 in which the smoothing capacitor 21 is housed, the brush 27, the metal frame 26, the input filter case 63, the rear bracket 4, and the rotor 7 are exposed to the second cooling air W2. Consequently, heat generated in the power semiconductor module 20 is dissipated into the second cooling air W2 via the metal frame 26, heat generated in the smoothing capacitor 21 is dissipated into the second cooling air W2 via air in the capacitor case 62 and the capacitor case 62, frictional heat of the rear side bearing 11 and heat generated in the stator 9 are dissipated into the second cooling air W2 via the rear bracket 4, and heat generated in the field winding 8 is dissipated into the second cooling air W2 via the rotor 7. Because of this, a temperature rise in each constituent member of the rotating electrical machine 100 is restricted. Also, the coil end of the stator winding 92 is cooled by the second cooling air W2 flowing along the third ventilation passage R3.

Although not shown, thermal resistance from the smoothing capacitor 21 to the capacitor case 62, or thermal resistance from the coil or the capacitor of the input filter 22 to the input filter case 63, can be reduced, and the temperature of the smoothing capacitor 21 or of the coil or the capacitor of the input filter 22 can be further reduced, by a heat transmitting member being interposed between the smoothing capacitor 21 and an inner wall of the capacitor case 62, or between the coil or the capacitor of the input filter 22 and an inner wall of the input filter case 63. Also, vibration resistance can also be improved by a heat transmitting member being interposed between the smoothing capacitor 21 and the inner wall of the capacitor case 62, or between the coil or the capacitor of the input filter 22 and the inner wall of the input filter case 63.

A low viscosity grease or gel, an adhesive, a sheet, a tape, or the like can be used as the heat transmitting member interposed between the smoothing capacitor 21 and the inner wall of the capacitor case 62 or between the coil or the capacitor of the input filter 22 and the inner wall of the input filter case 63, or a material the same as that of the potting member 61 can be used. When a multiple of smoothing capacitors 21 are provided, each pair of smoothing capacitors can be thermally connected, and a temperature difference between each pair of smoothing capacitors reduced, by a heat transmitting member being interposed between each pair of smoothing capacitors. Because of this, there is no occurrence of a smoothing capacitor with low electrical resistance due to a fluctuation in electrical resistance caused by a temperature difference between a pair of smoothing capacitors, and too much current flowing into a specific smoothing capacitor, shortening the lifespan thereof, can be prevented.

When disposing a heat transmitting member around a whole outer periphery of the smoothing capacitor 21 and the coil or the capacitor of the input filter 22, a heat transmitting effect increases further, but even when disposing a heat transmitting member in only one portion of the outer periphery of the smoothing capacitor 21 and the coil or the capacitor of the input filter 22, a temperature reducing effect with respect to the smoothing capacitor 21 and the coil or the capacitor of the input filter 22 increases because the thermal conductivity of the heat transmitting member is one to two or more orders of magnitude higher than the thermal conductivity of air. The capacitor case 62 and the input filter case 63 may be made of resin, but heat transmitting properties and heat dissipating properties can be further improved by the capacitor case 62 and the input filter case 63 being made of a metal such as aluminum.

As the rotating electrical machine 100 according to the first embodiment is configured as previously described, an axial direction increase in size is restricted, and temperature can be reduced by heat generated by the power semiconductor module 20, the field circuit module 60, the control substrate 25, the smoothing capacitor 21, the input filter 22, the brush 27, the stator 9, the field winding 8, the rotor 7, the rear side bearing 11, the front side bearing 10, and the like, being dissipated into the first cooling air W1 and the second cooling air W2.

Furthermore, by causing the refrigerant 58 to flow into the metal frame 26, the cooling performance of the power supply unit 2 can be improved. Herein, a passage cover 64 can be provided in the refrigerant passage 57 on the rear bracket 4 side of the metal frame 26, as shown in FIG. 1, or a pipe of a metal such as copper, aluminum, or stainless steel can be formed on the metal frame 26 by connecting using an adhesive, caulking, brazing, or the like, or a configuration can be such that a cavity is formed when casting, or the like.

A wiring member 65 in which the bus bar 45 is incorporated is fastened to the rear bracket 4 by a second screw 66. When a head portion of the second screw 66 coincides with the refrigerant passage 57 in the axial direction, an axial direction increase in size is restricted, and the axial direction of the rotating electrical machine 100 can be reduced in size, by forming the passage cover 64 in a projecting form 67 coinciding with the second screw 66, and disposing the passage cover 64 and the second screw 66 in the same radial direction plane. The projecting form 67 of the passage cover 64 acts by forming a projecting portion in the refrigerant passage 57 in such a way that the flow of the refrigerant 58 does not change abruptly, but an increase in pressure loss can be restricted by adopting a tapered or arc form for the projecting form 67 so that the flow of the refrigerant 58 does not change abruptly. Although the second screw 66 has been described here, the same advantage can be obtained by disposing another constituent member of the rotating electrical machine main body 1 in an outer side depressed portion coinciding with the projecting form 67 of the passage cover 64, that is, the projecting portion of the refrigerant passage 57.

By a member 68 that fills a gap between the rear bracket 4 or the wiring member 65 and the metal frame 26, the passage cover 64, or the input filter 22 being interposed in each gap, the second cooling air W2 is prevented from leaking from between the metal frame 26 and the rear bracket 4, and the second cooling air W2 can reliably come into contact with, and cool, the capacitor case 62, the brush 27, and the input filter case 63. Because of this, an outer peripheral portion of the power supply unit 2 can be cooled by the refrigerant 58, and an inner peripheral portion can be cooled by the second cooling air W2.

Also, by the passage cover 64 or the input filter 22 mounted on the metal frame 26 and the wiring member 65 mounted on the rear bracket 4 being sandwiched by the metal frame 26 and the rear bracket 4 across the gap-filling member 68, vibration resistance can be improved. Rubber or the like having elasticity is appropriate as the gap-filling member 68. Furthermore, by using a member that has little thermal conductivity, like rubber, as the gap-filling member 68, a configuration wherein little heat from the rotating electrical machine main body 1 is transmitted to the power supply unit 2 can be adopted. When temperature resistance of a member used in the power supply unit 2 is low in comparison with that of a member used in the rotating electrical machine main body 1, a temperature rise of the power supply unit 2 can be restricted owing to a heat insulating effect of the gap-filling member 68.

Furthermore, although not shown, when a connection portion of the bus bar 45 and the stator winding 92 is exposed between the wiring member 65 and the metal frame 26, insulation can be secured by the gap-filling member 68 being interposed between the connection portion of the bus bar 45 and the stator winding 92 and the metal frame 26. Furthermore, the second cooling air W2 takes heat from each portion, the temperature of the second cooling air W2 rises, and the second cooling air W2 is discharged between the metal frame 26 and the rear bracket 4 from the second exhaust port 18, but as the gap-filling member 68 fills the gap between the metal frame 26 and the rear bracket 4, the second cooling air W2 is prevented from flowing into the second intake port 16 again, and a temperature rise can be restricted.

Although the present application is described above in terms of an exemplifying embodiment, it should be understood that the various features, aspects, and functionalities described in the embodiment are not limited in their applicability to the particular embodiment with which they are described, but instead can be applied, alone or in various combinations, to other embodiments. It is therefore understood that numerous modifications which have not been exemplified can be described without departing from the scope of the present application. For example, at least one constituent component may be modified, added, or eliminated.

What is claimed is:
1. A rotating electrical machine comprising:
a rotating electrical machine main body; and
a power supply unit, wherein
the rotating electrical machine main body and the power supply unit are integrally fixed by being disposed in parallel in an axial direction of the rotating electrical machine main body,
the rotating electrical machine main body includes
a stator fixed to a housing,
a rotor fixed to a rotor shaft supported so as to rotate freely by the housing, and
a cooling fan that rotates together with the rotor, causes a cooling air to be suctioned into an interior of the housing from an intake port provided in the housing and opening in the axial direction, and causes the cooling air to be discharged to an exterior of the housing from an exhaust port provided in the housing,
the power supply unit includes
a power circuit unit including a power semiconductor module that controls power supplied to the rotating electrical machine main body and a control part that controls power supplied to the rotating electrical machine main body,
a control substrate including a control circuit unit that controls the power circuit unit, and
a metal frame on which the power circuit unit and the control substrate are mounted, and in which a refrigerant passage along which a refrigerant is caused to flow is provided, and
the refrigerant passage is provided on the rotating electrical machine main body side of the metal frame, and is disposed on the outer side of the control part in a radial direction of the rotating electrical machine main body, and the refrigerant passage is disposed in the same plane as the control part in the axial direction,
wherein a projecting portion is formed in the refrigerant passage and protrudes from the rotating electrical machine main body side to the power supply unit side in the axial direction.

2. The rotating electrical machine according to claim 1, wherein a constituent member of the rotating electrical machine main body is disposed in an outer side depressed portion coinciding with the projecting portion.

3. The rotating electrical machine according to claim 2, wherein the projecting portion is tapered or of an arc form.

4. The rotating electrical machine according to claim 1, wherein the refrigerant passage, the power semiconductor module, and the control substrate are disposed sequentially in the axial direction from the rotating electrical machine main body.

5. The rotating electrical machine according to claim 1, wherein an inlet/outlet portion of the refrigerant passage is disposed in the radial direction of the rotating electrical machine main body.

6. The rotating electrical machine according to claim 1, wherein an inlet side and an outlet side of the refrigerant passage are disposed in opposite radial directions of the rotating electrical machine main body.

7. The rotating electrical machine according to claim 1, including a multiple of the power semiconductor module, wherein the multiple of the power semiconductor module is disposed in a U-shape, and the refrigerant passage is disposed so as to coincide with the multiple of the power semiconductor module.

8. The rotating electrical machine according to claim 1, including a field circuit module that configures a field circuit unit of the rotating electrical machine, wherein the field circuit module is disposed farther to a downstream side of the refrigerant passage than the power semiconductor module.

9. The rotating electrical machine according to claim 1, wherein the control substrate or a heat generating part mounted on the control substrate is disposed in a U-shape, and the refrigerant passage is disposed so as to coincide with the control substrate or the heat generating part.

10. The rotating electrical machine according to claim 1, wherein a terminal provided in the power semiconductor module is connected to the metal frame.

11. The rotating electrical machine according to claim 1, configured so that the cooling air suctioned into the intake port passes only in the axial direction.

12. The rotating electrical machine according to claim 1, including a positive electrode side conductor that connects a positive electrode side terminal of the power supply unit and a positive electrode side terminal of the power semiconductor module, wherein the positive electrode side conductor and the metal frame are disposed in parallel.

13. The rotating electrical machine according to claim 1, wherein the control part is at least one of a rotation sensor that detects a rotation of the rotating electrical machine, a brush that supplies power to the rotor, and an input filter that restricts noise.

14. The rotating electrical machine according to claim 13, including a member that fills a gap between the refrigerant passage and the rotating electrical machine main body, wherein either or both of the input filter and a wiring member mounted on a rear bracket configuring the housing are disposed between the member filling the gap and the metal frame or the rotating electrical machine main body.

15. The rotating electrical machine according to claim 1, including a member that fills a gap between the refrigerant passage and the rotating electrical machine main body.

16. The rotating electrical machine according to claim 1, wherein the control part is mounted on the metal frame.

17. The rotating electrical machine according to claim 16, wherein the control part includes a smoothing capacitor that smooths a current flowing into a stator winding included in the stator and an input filter that restricts noise, and the smoothing capacitor and the input filter are disposed so as to sandwich the metal frame.

18. The rotating electrical machine according to claim 1, wherein the metal frame is configured of a porous metal.

* * * * *